United States Patent [19]

Nakazawa

[11] Patent Number: 5,089,761
[45] Date of Patent: Feb. 18, 1992

[54] MOTOR CONTROL SYSTEM
[75] Inventor: Koichi Nakazawa, Amagasaki, Japan
[73] Assignee: Matsushita Electric Industrial Co., Ltd., Osaka, Japan
[21] Appl. No.: 548,593
[22] Filed: Jul. 5, 1990
[30] Foreign Application Priority Data
Jul. 11, 1989 [JP] Japan ................................. 1-179562
[51] Int. Cl.[5] ............................................. H02P 1/02
[52] U.S. Cl. .................................... 318/811; 318/599; 318/799; 388/811
[58] Field of Search ................ 318/798, 811, 799–801, 318/599, 696; 388/811, 819, 911

[56] References Cited
U.S. PATENT DOCUMENTS
4,371,818  2/1983  Lewis .................................. 318/696

Primary Examiner—William M. Shoop, Jr.
Assistant Examiner—John W. Cabeca
Attorney, Agent, or Firm—Stevens, Davis, Miller & Mosher

[57] ABSTRACT

A motor control system is disclosed which includes an encoder for generating pulses in proportion to the rotational amount of the motor. A speed instructing unit provides a speed instruction for the desired rotational speed of the motor. A speed control unit calculates (1) the actual rotational speed of the motor based on the pulse signal from the encoder and (2) a voltage to be applied to the motor and outputs a PWM signal which represents the actual motor speed. The PWM signal is identical with the voltage to be applied to the motor. This arrangement ensures that the motor speed will follow the speed instruction. A driver unit supplies electric power to the motor by amplifying the PWM signal. The speed of the motor is controlled by (i) adding the PWM signal which has been calculated by the speed control unit with a compensation value depending upon the rotational speed of the motor or alternatively (ii) adding the PWM signal which has been calculated by the speed control unit with a first compensation value when the motor is servo-locked and adding the PWM signal which has been calculated by the speed control unit with a second compensation value depending upon the rotational speed of the motor when the motor is rotated. This achieves nonlinearity compensation for the motor and motor control without causing oscillations when the motor is servo-locked and is stopped and without causing a time lag with respect to a speed instruction when the motor is started-up.

3 Claims, 5 Drawing Sheets

MOTOR CONTROL SYSTEM

BACKGROUND OF THE INVENTION

The present invention relates to a motor control system for controlling the position and/or the speed of a load which is driven by the motor.

Various motors are used for carrying out positioning and speed control of automatic machines. A control system for such types of motors is generally configured as shown in FIGS. 1 and 2 for controlling the speed and the position of the motors, respectively.

In FIGS. 1 and 2, reference numeral 1 denotes a motor; numeral 2 denotes an encoder for providing pulses in proportion to the rotational amount of said motor, 3 speed instructing means for providing a speed instruction for said motor, 4 speed control means for outputting a PWM signal which calculates a rotational speed of the motor based on the pulse signal from said encoder and calculates a voltage to be applied to the motor so that the rotational speed of the motor will follow said speed instruction, 5 driver means for supplying electric power to said motor by amplifying said PWM signal, 7 a position instruction means for providing a position instruction for the motor, and 8 a position control means which detects the rotational position of the motor based on the pulse signal from the encoder and calculates a speed instruction value for the speed control means 4 so that the rotational position of the motor will follow the position instruction for outputting a speed instruction signal. Since the system for controlling the position shown in FIG. 2 is identical with the system shown in FIG. 1 except that the speed instructing means 3 in FIG. 1 is replaced with the position instruction means 7 and the position control means 8, description of the system in FIG. 2 will be omitted and only the motor control system for controlling the speed will be described.

In FIG. 1, the speed control means 4 may comprise an analog circuit or alternatively may comprise a digital circuit. If it comprises a digital circuit, it may be formed as is disclosed in, for example, "SYSTEM AND CONTROL" Vol. 26, No. 11, pp. 695 through 703, 1983. FIG. 3 shows a block diagram of the speed control system which comprises a digital circuit.

In the block diagram of FIG. 3, a part which is encircled by a broken line represents the block diagram of the motor. A reference Kt denotes an induction voltage constant, a reference Ke denotes a torque constant, J a moment of inertia of the motor and a load, and R and J denote resistance and inductance of a winding of the motor, respectively. A method of detecting the speed is classified into two methods. One method includes calculating the speed based on the number of the pulses from the encoder counted in a predetermined sampling time and the other method includes calculating the speed based upon an inverse of the cycle of pulses from the encoder which is counted with a reference clock signal. Both methods can be used for the present invention. The speed which is calculated as mentioned above is multiplied with the constant Kf. The multiplied value is compared to the instruction speed. A value which is obtained by multiplying a speed deviation therebetween with a constant Kp is added with a value which is obtained by multiplying an integrated speed deviation with a constant Ki. Thus the obtained value has subtracted therefrom a value which is obtained by multiplying a change in the detected speed with a constant Kd. An output value of the PWM signal is calculated by multiplying the result with a constant Kv. It is to be understood herein that the PWM signal is identical with the voltage which is applied to the motor 1. Kf, Kp, Ki, Kd, and Kv denote control constants. The output value of the PWM signal is calculated by an equation as follows:

$$Vp = (Kp \times E + Ki \times I - Kd \times D) \times Kv$$

wherein E denotes a difference between the speed instruction and the detected speed;

I denotes a value which is obtained by integrating a speed deviation E with an integration term; and D denotes a value which is obtained by differentiating the detected speed with an acceleration.

However, since the whole system, including the motor and the load, has a non-linearity as shown in FIG. 4, there is a problem that the aforementioned method will readily causes oscillations on servo-locking or stopping of the motor. There is also a problem that a time lag will readily occur on starting-up of the motor since the result of the operation of the PWM output value will not quickly reach a voltage at which a motor will begin to rotate.

SUMMARY OF THE INVENTION

The present invention is directed to overcoming the aforementioned problems.

It is an object of the present invention to provide a novel motor control system achieving compensation for the non-linearity of the motor.

It is another object of the present invention to provide a motor control system which causes no oscillation on servo-locking and stopping of the motor and can control the motor without causing a time lag with respect to a speed instruction on starting-up of the motor.

In order to overcome the afore-mentioned problems, in a first aspect of the present invention there is provided a motor control system, an encoder for generating pulses in proportion to the rotational amount of a motor to be controlled, speed instructing means for providing a speed instruction for said motor, speed control means for outputting a PWM signal which calculates a rotational speed of the motor based on the pulse signal from said encoder and calculates a voltage to be applied to the motor so that the rotational speed of the motor will follow said speed instruction, and driver means for supplying an electric power to said motor by amplifying said PWM signal, whereby the PWM output value which has been calculated by said speed control means is added with a compensation value depending upon the rotational speed of said motor.

In order to overcome the afore-mentioned problems, in a second aspect of the present invention there is provided a motor control system comprising an encoder for generating pulses in proportion to the rotational amount of a motor to be controlled, speed instructing means for providing a speed instruction for said motor, speed control means for outputting a PWM signal which calculates a rotational speed of the motor based on the pulse signal from said encoder and calculates a voltage to be applied to the motor so that the rotational speed of the motor will follow said speed instruction, and driver means for supplying an electric power to said motor by amplifying said PWM signal, whereby the PWM output value which has been calculated by said speed control means is added with a compensation value when said motor is servo-locked and the PWM output value which has been calculated by said speed control means is added with a compensation value depending upon the rotational speed of said motor when the motor is rotated.

The reason why oscillation occurs when a motor is servo-locked or stopped or a time lag in the operation of a motor readily occurs is that the whole system including the motor and a load has a non-linearity. Its non-linearity is caused by the characteristics of the motor per se and the characteristics of a power switching element of the driver means and the static and dynamic friction torques of the load. Accordingly, in the first aspect of the present invention a motor can be controlled without causing oscillation on servo-locking or stopping of the motor and a time lag with respect to a speed instruction on starting-up of the motor (1) by adding a PWM output value (which has been calculated by assuming the system) as a linear system with a compensation value for compensating for the characteristics of the motor per se and the characteristics of the power switching element of the driver means and the static and dynamic friction torques when the motor is stopped or rotated at a low speed and (2) by adding the PWM output value with a compensation value for compensating for the friction torque of the load when the motor is rotated. In the second aspect of the present invention a motor can be controlled without causing oscillation on servo-locking or stopping of the motor and a time lag with respect to a speed instruction on starting-up of the motor. This is accomplished by adding a PWM output value (which has been calculated by assuming the system) as a linear system with a given compensation value for compensating for the characteristics of the motor per se and the characteristics of the power switching element of the driver means and the static and dynamic friction torque when the motor is servo-locked, and (2) by adding (a) a PWM output value (which has been calculated by assuming the system as a linear system) with a given compensation value for compensating for the characteristics of the motor per se and the characteristics of the power switching element of the driver means and the static and dynamic friction torques when the motor is rotated at a very low speed and by adding (b) the PWM output value with a compensation value for compensating for the friction torque of the load when the motor is rotated at a relatively high speed.

DESCRIPTION OF THE PREFERRED EMBODIMENTS

An embodiment of the present invention will now be described with reference to the drawings.

Figure 1:
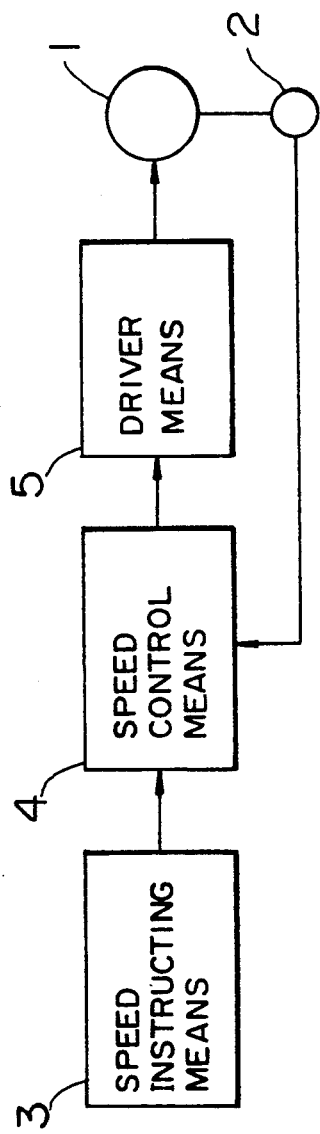
FIG. 1 is a block diagram showing the structure of a conventional speed control system.
Figure 2:
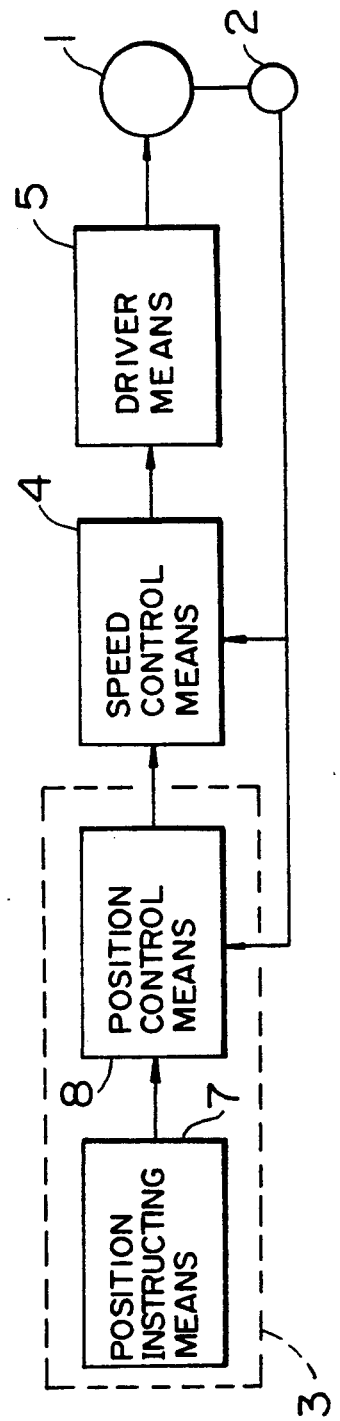
FIG. 2 is a block diagram showing the structure of a conventional speed control system.
Figure 3:
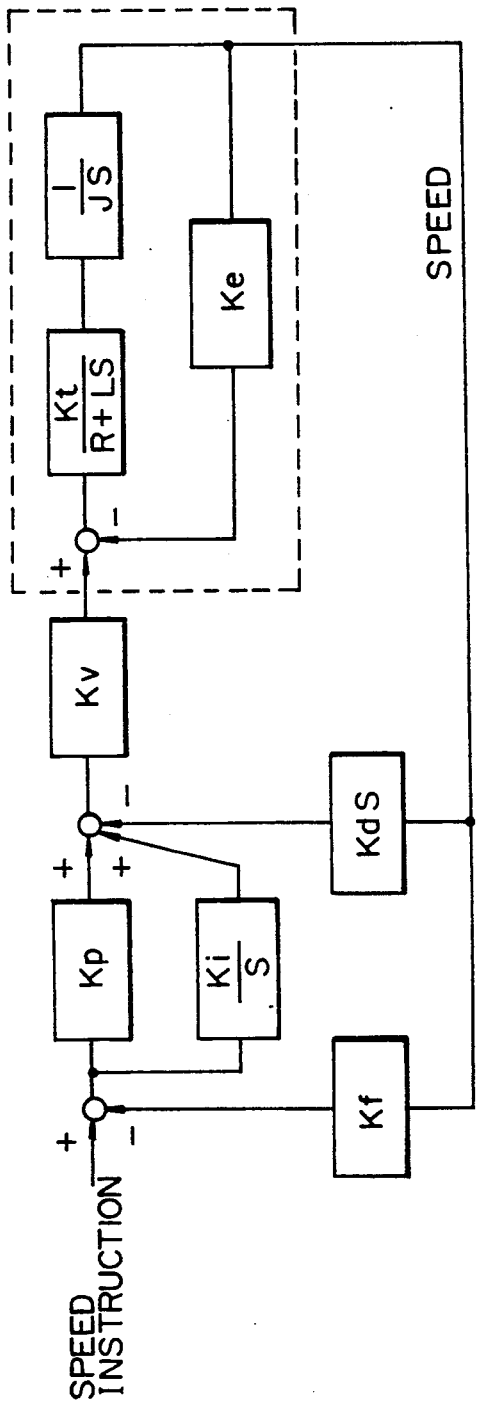
FIG. 3 is a block diagram showing the structure of a conventional speed control system.
Figure 4:
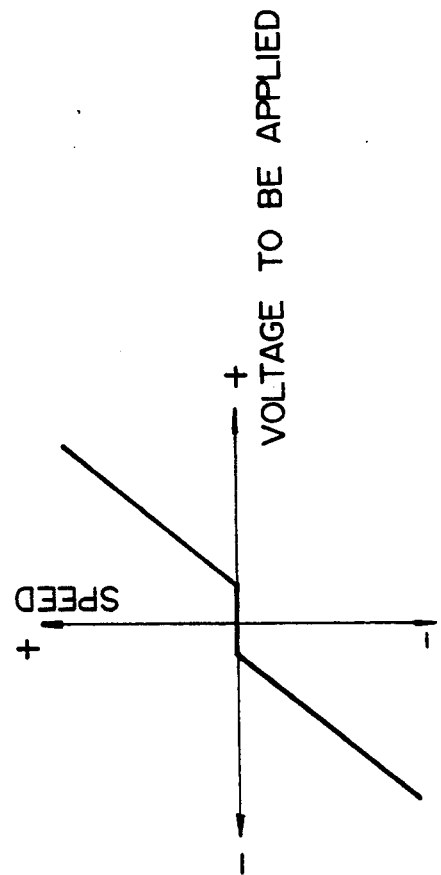
FIG. 4 is a graph showing the non-linearity of the control system including a motor and a load shown in FIGS. 1 and 2.
Figure 5:
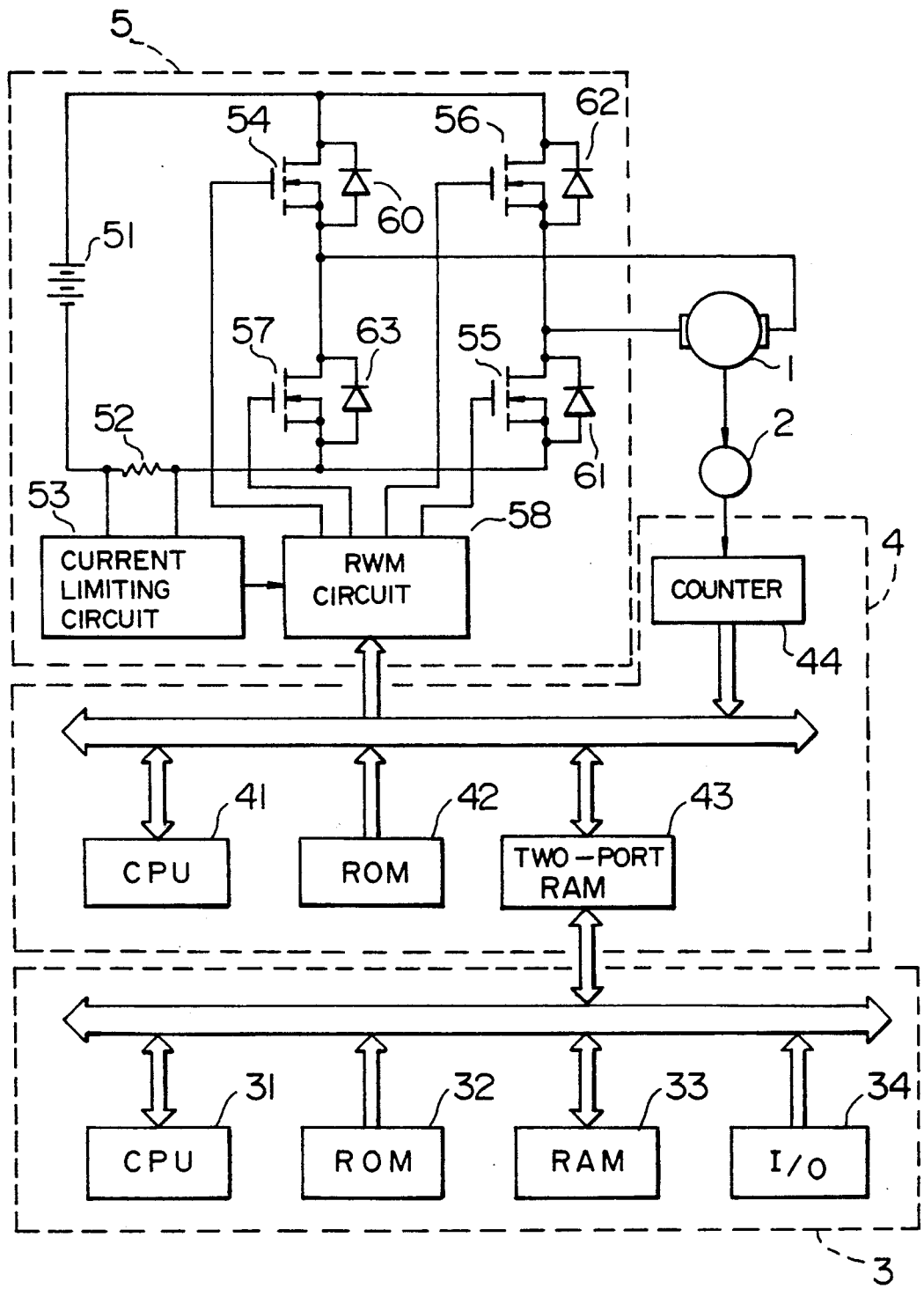
FIG. 5 is a block diagram showing a motor control system of the present invention.

Referring now to FIG. 5, reference numeral 1 represents a motor; reference numeral 2 denotes an encoder which generates pulses in proportion to the rotational amount of the motor; 3 a speed instructing means for providing a speed instruction for the motor; 31 a CPU which calculates speed instruction data; 32 a ROM which stores an operation program for the CPU 31; 33 a RAM which is temporarily used when the CPU 31 executes an arithmetic operation; 34 an I/O for inputting a signal to the control system from a sensor and for outputting a signal to external devices. Reference numeral 4 denotes speed control means which calculates the actual rotational speed of the motor based on the pulse signal from the encoder and calculates a voltage to be applied to the motor so that the rotational speed will follow the speed instruction for outputting a PWM signal; 41 a CPU for executing an arithmetic operation for speed control; 42 a ROM which stores an operation program for the CPU 41; 43 a two-port RAM which is temporarily used when the CPU 41 executes an arithmetic operation or for receiving and transmitting data from and to the CPU 31; 44 a counter which counts the pulses from the encoder 2; 5 a driver means which amplifies the PWM signal and supplies the motor with an electric power; 51 a direct current power source; 52 a resistor for detecting a current which flows from the direct current power source 51; 53 a current limiting circuit for limiting the current which is detected by the resistor; 54, 55, 56, and 57 denote power MOSFETs for conducting a current through the motor 1; 58 a PWM circuit which converts a signal from the current limiting circuit 53 into a signal having a width proportional to PWM output data operated in the CPU 41 and amplifies the converted signal for applying the amplified signal to the power MOSFETs 54, 55, 56, and 57 as a gate signal; and 60, 61, 62, and 63 denote free wheel diodes.

Figure 6:
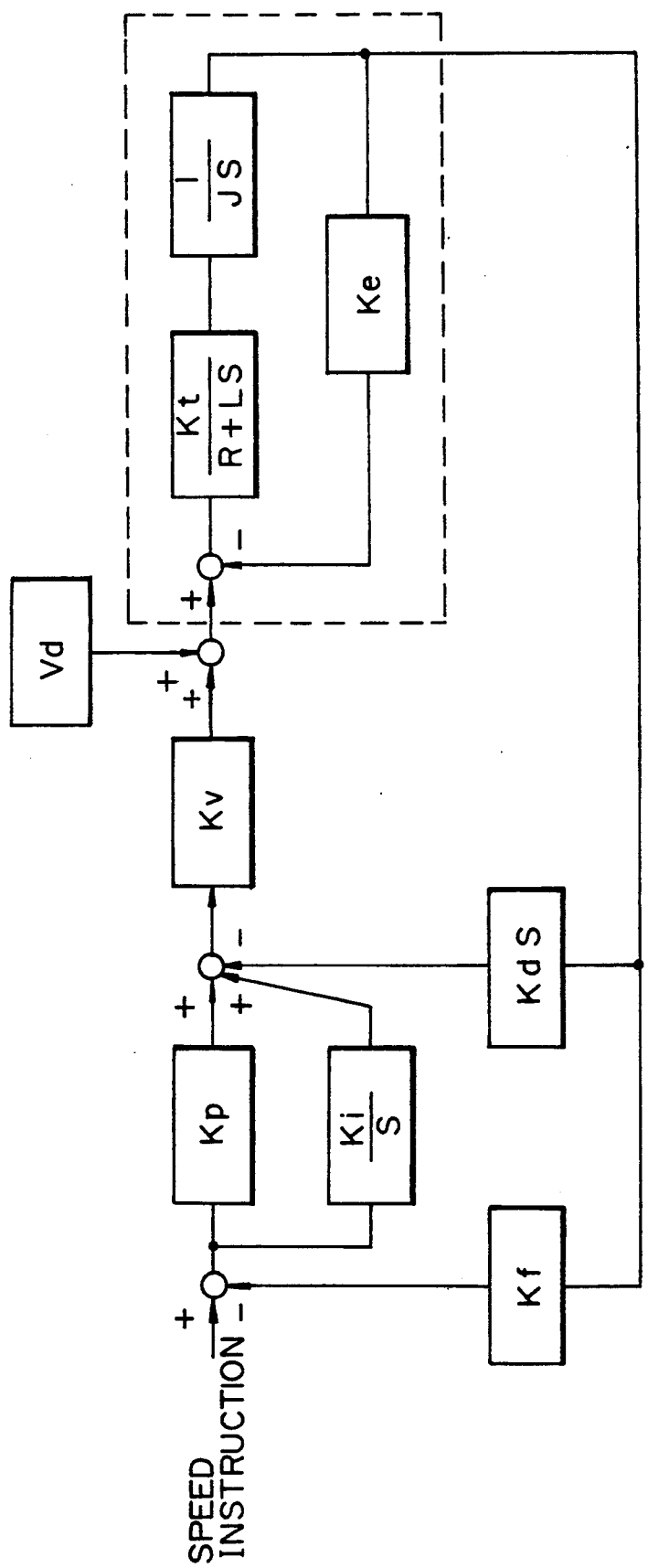
FIG. 6 is a block diagram showing a speed control system of the present invention.

The operation of the system will now be described. In the system shown in FIG. 6, the CPU 31 in advance reads the program stored in the ROM 32 and executes it and computes a speed instruction value and writes speed instruction data to the two-port RAM 43. When the CPU 41 reads the speed instruction data in the two-port RAM 43 which have been written by the CPU 31, it executes a speed control program which was in advance stored in the ROM 42. The CPU 41 first reads the data in the counter 44 and determines the actual rotational speed by calculating a change in data within unit time. The CPU 41 calculates a PWM output value Vp as shown in the block diagram in FIG. 6 in accordance with the following calculation equation:

$$Vp = (Kp \times E + Ki \times I - Kd \times D) \times Kv + Vd$$

wherein Vp denotes a PWM output value;
E denotes a difference between the speed instruction and the detected speed;
I denotes a value which is obtained by integrating the speed deviation E with an integration term; and
D denotes a value which is obtained by differentiating the detected speed with an acceleration.

Figure 7:
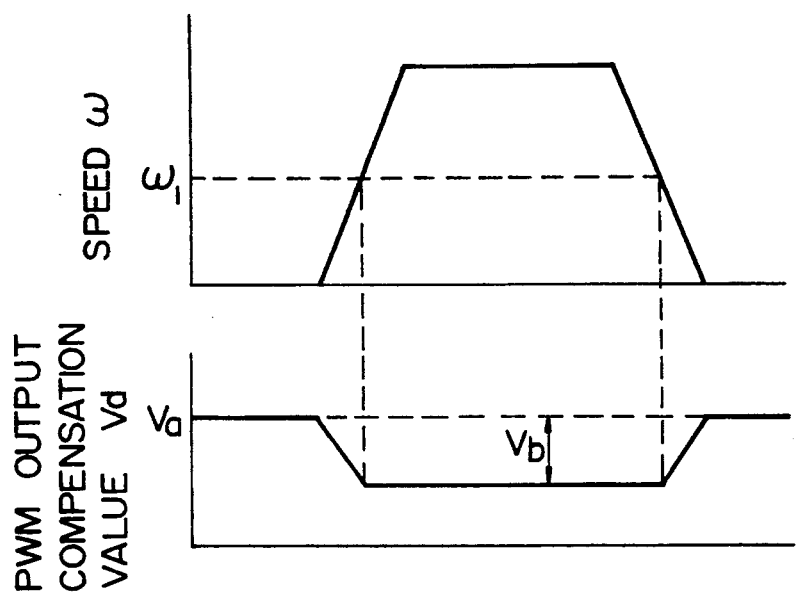
FIG. 7 is a chart showing the relationship between the motor speed and the PWM output compensation value in the first aspect of the present invention.

Vd denotes a PWM output compensation value;

Vd is a value represented by a function of the detected speed ω in the first aspect of the present invention as follows:

$$Vd = Vd - Vd \times \omega \div \omega l \quad (0 \leq \omega \leq \omega l)$$

$$Vd = Va - Vb \quad (\omega > \omega l)$$

wherein ωl represents a given constant value at which compensation for the PWM output by speed is almost unnecessary. The relationship between the motor speed ω and the PWM output compensation value Vd is shown in FIG. 7.

Figure 8:
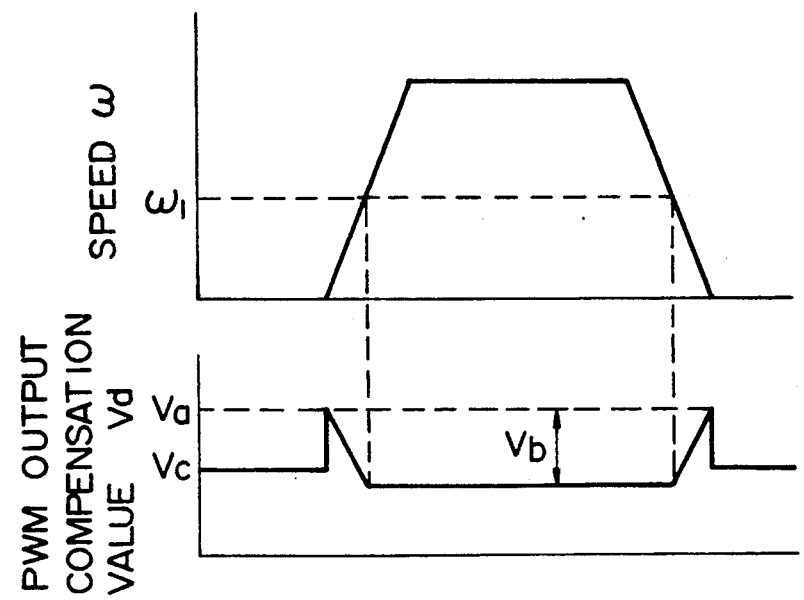
FIG. 8 is a chart showing the relationship between the motor speed and the PWM output compensation value in the second aspect of the present invention.

In the second aspect of the present invention, Vd assumes a constant value Vc when the motor is servo-locked and assumes a value which is represented by a function of the detected speed ω similarly to that in the first aspect of the present invention when the motor is rotated as follows:

$$Vd = Va - Vb \times \omega \div \omega l \quad (0 \leq \bullet \leq \omega l)$$

$$Vd = Va - Vb \quad (\omega \geq \omega l)$$

wherein ωl represents a given constant value at which compensation for the PWM output by speed is almost unnecessary. The relationship between the motor speed ω and the PWM output compensation value Vd in the second aspect of the present invention is shown in FIG. 8.

The CPU 41 sends the calculated PWM value to the PWM circuit 58, which converts the PWM output value to a pulse width signal and amplifies the converted signal for sending it to the power MOSFETs 54, and 55 or the power MOSFETs 56 and 57 as a gate signal for applying a voltage to the motor 1. The CPU 41 then reads the data from the counter 44 and calculates the actual motor speed and calculates a PWM output value as is described above for outputting a PWM output value to the PWM output circuit 58 for applying a voltage to the motor 1. Such calculation is repeated for carrying out speed control.

Each of the first and second aspects of the present invention is selected depending upon the values of the control constants. It is necessary to keep the Vd value low on servo-locking of the motor when the value of the constant is relatively high.

In accordance with the present embodiment of the first aspect of the present invention, a motor can be controlled without causing oscillation on servo-locking or stopping of the motor and a lag with respect to a speed instruction on starting-up of the motor by adding a PWM output value (which has been calculated by assuming the system) as a linear system with a compensation value for compensating for the characteristics of the motor per se and the characteristics of the power switching element of the driver means and the static and dynamic friction torques when the motor is stopped or rotated at a low speed and by adding the PWM output value with a compensation value for compensating for the friction torque of the load when the motor is rotated.

In the second aspect of the present invention a motor can be controlled without causing oscillation on servo-locking or stopping of the motor and a lag with respect to a speed instruction on starting-up of the motor by adding a PWM output value (which has been calculated by assuming the system) as a linear system with a given compensation value for compensating for the characteristics of the motor per se and the characteristics of the power switching element of the driver means and the static and dynamic friction torques when the motor is servo-locked and by adding a PWM output value (which has been calculated by assuming the system as a linear system) with a given compensation value for compensating for the characteristics of the motor per se and the characteristics of the power switching element of the driver means and the static and dynamic friction torques when the motor is rotated at a very low speed and by adding the PWM output value with a compensation value for compensating for the friction torque of the load when the motor is rotated at a relatively high speed.

Although a DC motor is driven in the present embodiment, it is apparent that an AC motor may be similarly driven. Although the speed control means shown in the control block diagrams does not include a current control loop which is a minor loop for speed, no problem would occur if the speed control means includes a current control loop in which a current is detected.

As mentioned above in accordance with the present invention advantages are attained in that nonlinearity of a motor can be compensated for and a motor can be controlled without causing oscillation when the motor is servo-locked and is stopped and without causing a lag with respect to a speed instruction when the motor is started-up.

What is claimed is:

1. A motor control system for controlling rotations of a motor during a time period from starting of the motor to the motor reaching stable rotation, said system comprising:

an encoder means for detecting a rotational amount of the motor and for generating a pulse signal in proportion to said rotational amount, speed instructing means for providing a speed instruction representing a desired rotational speed for said motor, speed control means receiving said pulse signal from said encoder means and for calculating (a) an actual rotational speed of the motor based on the pulse signal from said encoder and (b) a voltage to be applied to the motor and for outputting a PWM signal which represents said actual rotational speed and which is identical with said voltage to be applied to the motor so that said actual rotational speed of the motor will correspond to said desired rotational speed, driver means for receiving said PWM signal and for supplying electric power to said motor by amplifying said PWM signal, means providing a first compensation value and a second compensation value, and means for adding the PWM signal with said first compensation value when said motor is servo-locked and for adding the PWM signal with said second compensation value depending upon said actual rotational speed of said motor when the motor is rotated at rotational speeds higher than a rotational speed of said motor when said motor is servo-locked.

2. A system as in claim 1, wherein said first compensation value is a predetermined constant value.

3. A system as in claim 1, wherein said second compensation value added to said PWM signal has a variable magnitude which varies among a plurality of predetermined compensation values corresponding to different rotational speeds of said motor, and said second compensation value is selected among said plurality of predetermined compensation values in accordance with said actual rotational speed of said motor.

* * * * *